(12) United States Patent
Xiong et al.

(10) Patent No.: US 10,185,705 B2
(45) Date of Patent: Jan. 22, 2019

(54) DETECTING TEXT TRUNCATION IN A GRAPHICAL USER INTERFACE

(71) Applicant: CA, Inc., New York, NY (US)

(72) Inventors: Zaiwei Xiong, Beijing (CN); Yue Liu, Beijing (CN); Mingzhe Cai, Beijing (CN); Fang Wu, Beijing (CN)

(73) Assignee: CA, Inc., New York, NY (US)

( * ) Notice: Subject to any disclaimer, the term of this patent is extended or adjusted under 35 U.S.C. 154(b) by 280 days.

(21) Appl. No.: 14/810,912

(22) Filed: Jul. 28, 2015

(65) Prior Publication Data

US 2017/0031879 A1 Feb. 2, 2017

(51) Int. Cl.
*G06F 17/00* (2006.01)
*G06F 17/22* (2006.01)
*G06F 17/21* (2006.01)
*G06F 17/30* (2006.01)

(52) U.S. Cl.
CPC ........ *G06F 17/2247* (2013.01); *G06F 17/212* (2013.01); *G06F 17/214* (2013.01); *G06F 17/30905* (2013.01)

(58) Field of Classification Search
CPC . G06F 17/212; G06F 17/214; G06F 17/30905
See application file for complete search history.

(56) References Cited

U.S. PATENT DOCUMENTS

| 7,895,514 B1* | 2/2011 | Edmunds | G06F 8/20 715/234 |
| 9,196,226 B2* | 11/2015 | Georgiev | G06F 3/147 |
| 2010/0037153 A1* | 2/2010 | Rogers | G06F 3/0481 715/758 |
| 2011/0320938 A1* | 12/2011 | Schorsch | G06F 17/214 715/269 |
| 2015/0346982 A1 | 12/2015 | Johnson et al. | |

* cited by examiner

*Primary Examiner* — Mohammed H Zuberi
(74) *Attorney, Agent, or Firm* — Meyertons, Hood, Kivlin, Kowert & Goetzel, P.C.

(57) ABSTRACT

A method and apparatus is provided for automatically detecting text truncation in a page of a graphical user interface (GUI). Text that is displayed in a graphical user interface and a corresponding web element containing the text is identified. Dimensions of the text and of the corresponding element are obtained. Text truncation is detected by comparing dimensions of the text to the dimensions of the corresponding web element.

20 Claims, 7 Drawing Sheets

| ELEMENT | TEXT | RESULT |
|---|---|---|
| ELEMENT1 | TEXT1 | 0 |
| ELEMENT2 | TEXT2 | 0 |
| ELEMENT3 | TEXT3 | 1 |
| ELEMENT4 | TEXT4 | 2 |
| ... | ... | ... |
| ELEMENTn | TEXTn | RESULTn |

DETECTING TEXT TRUNCATION IN A GRAPHICAL USER INTERFACE

BACKGROUND

The present disclosure relates generally to testing of graphical user interfaces (GUIs) and, more particularly to detection of layout corruption problems in a GUI.

Hypertext Markup Language (HTML) is a standard markup language that is used to create most webpages. An HTML document comprises web elements that describe the structure and content of the webpage. A web browser reads the HTML document and renders the webpage described by the HTML document in a browser window. Common browsers include INTERNET EXPLORER®, SAFARI®, FIREFOX®, and CHROME®. Different versions of these browsers exist for different operating systems, such as MICROSOFT WINDOWS®, APPLE OSX®, APPLE IOS®, and ANDROID®.

For many web based applications, a browser is also used to remotely access an application located on a remote server. The graphical user interface (GUI) for the application is displayed in a browser window. The GUI is essentially a collection of HTML documents that are rendered by the browser. Before such web-based applications are released, GUI testing is performed to ensure that the GUI displays properly in the browser window.

A common problem with GUI testing is that there are many different browsers and many operating systems. Both the browser and the operating system impact how an HTML document is rendered on the screen. Also, the language used for text elements in an HTML document impacts how the GUI or web page is rendered. Given the multitude of browsers, operating systems, and languages, it is impractical to test every possible combination. Consequently, user interface testing is usually limited to the most common combinations of browsers and operating systems, and for only a few languages. Because all possible combinations are not tested, there is a risk that the GUI will not render properly in some scenarios resulting in corruption of the GUI layout. Common layout corruption problems include text truncation and overlapping web elements.

In order to improve quality of web-based software products, there is a need to automate GUI testing in order to minimize the number of layout corruption problems.

BRIEF SUMMARY

One aspect of the present disclosure comprises a method and apparatus for automatically detecting text truncation in graphical user interface (GUI). A layout detection system identifies text that is displayed in a graphical user interface and a corresponding web element containing the text. The layout detection system obtains the dimensions of the text and of the corresponding web element. In one exemplary embodiment, the text dimensions are obtained by creating a trial web element with no dimensions, assigning font properties to the trial web element, copying the text to the trial web element, and obtaining the dimensions of the trial web element. Text truncation is detected by comparing dimensions of the text to the dimensions of the corresponding web element. The layout detection system detects vertical text truncation when the length of the web element is less than the length of the text. The layout detection system detects horizontal text truncation when the height of the web element is less than the height of the text.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 1 illustrates vertical text truncation in a GUI.

FIG. 2 illustrates horizontal text truncation in a GUI.

DETAILED DESCRIPTION

Figure 3:
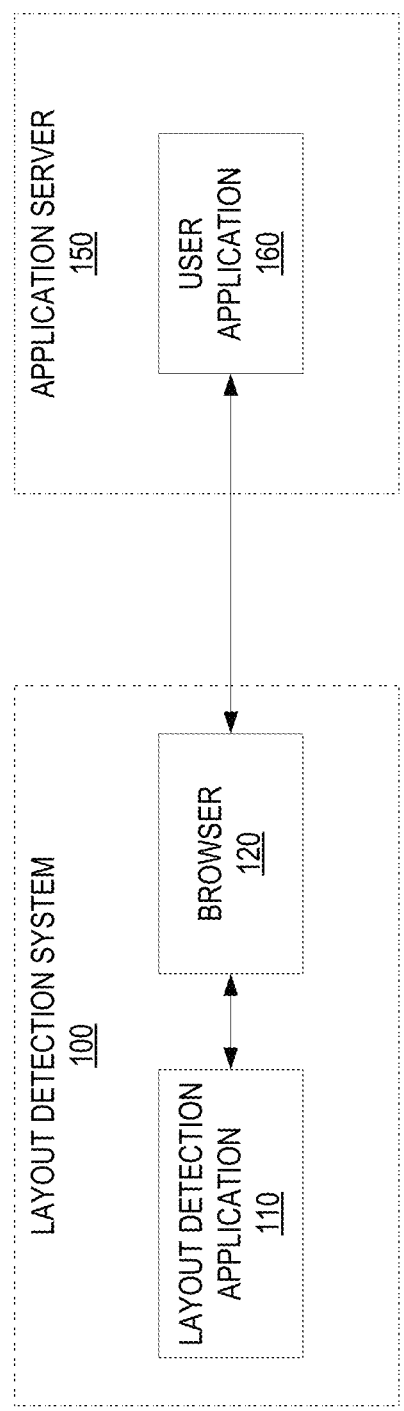
FIG. 3 is illustrates one embodiment of a layout detection system configured to detect text truncation in a GUI.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figures 1, 2:
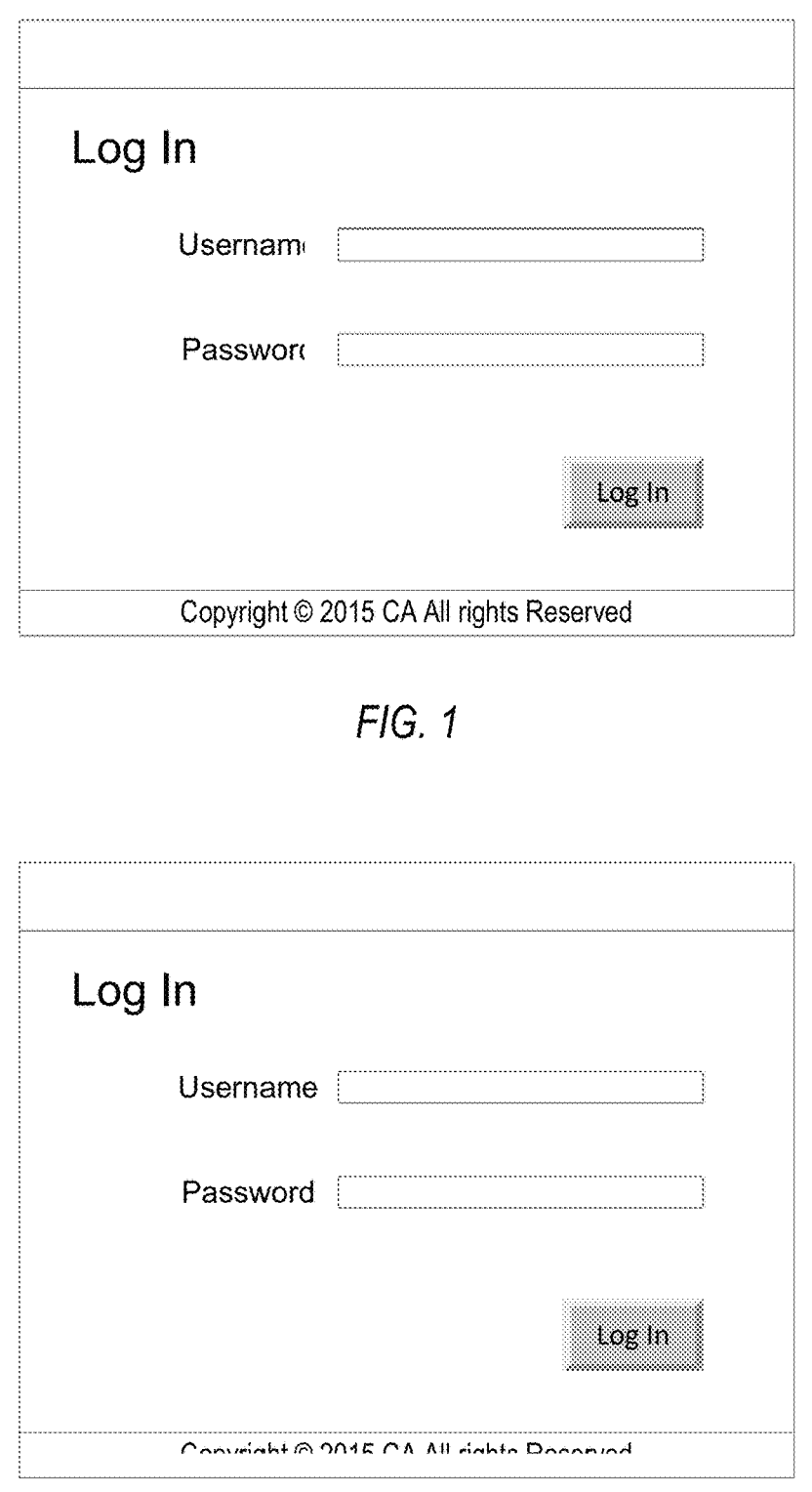

Referring now to the drawings, methods and apparatus are described to perform automated testing of a graphical user interface (GUI) to detect layout corruption problems. One common type of layout corruption is text truncation. Text truncation occurs when the dimensions of a web element are not sufficient to display the text contained in the web element. Vertical text truncation occurs when the length of the text is greater than the length of the web element containing the text so that the text is truncated along a vertical line. FIG. 1 illustrates an example of vertical text truncation where the length of the labels for the text boxes are too short and cut off the label text. Horizontal text truncation occurs when the height of the text exceeds the height of the web element so that the text is truncated along a horizontal line. FIG. 2 shows an example of horizontal text truncation where height of the division or section of the login page containing the copyright notice is not enough for the text and slices the text horizontally. While the dimensions of web elements in an HTML document are easy to obtain, there is no known technique to obtain the dimensions of the text. Text truncation is therefore commonly detected by loading each page in a browser and visually inspecting each page.

FIG. 3 is a schematic representation of an automated layout detection system 100 according to an exemplary embodiment of the disclosure that detects text truncation problems in a GUI of a web-based application. The layout detection system 100 comprises a computer that serves as the platform for the layout detection system 100. The computer has a layout detection application 110 and one or more browsers 120 to be tested installed thereon. The browsers 120 are able to remotely access a user application 160 installed on an application server 150. As previously described, the user application 160 comprises a GUI that is to be tested by the layout detection system 100. The layout detection application 110 controls and interacts with a selected browser 120 during testing as will be hereinafter described.

In one exemplary embodiment, the layout detection application 110 uses a browser object model (BOM) and document object model (DOM) to interact with and control a browser 120 selected for a test. The BOM is a convention for representing objects in the browser application and provides an application programming interface (API) that exposes the functionality of the browser 120 to the layout detection application 110. In general, the BOM is application specific, so different browsers 120 will have different BOMs. The layout detection application 110 can use the BOM for example to instruct the browser 120 to access the user application 160 on the application server 150, and to navigate among the different screens or pages in the GUI of the user application 160. The DOM, which may be considered part of the BOM, is a convention for representing objects in a HTML document that is displayed by the browser 120 and provides an API that is used to dynamically access and update the HTML document. The DOM is generally cross-platform and language independent. The layout detection application 110 can use the DOM for example to extract information about objects in the GUI displayed by the browser 120 and to update the objects in the GUI.

During testing, the layout detection application 110 instructs a browser 120 to remotely access the user application 160 on the application server 150 and to navigate among the different screens or pages of the GUI provided by the user application 160. When a page of the GUI is loaded, the layout detection application 110 uses the BOM and DOM to parse the current page of the GUI and identify web elements containing text. The term web elements as used herein refers to visual elements in the GUI, which are represented by DOM objects. Examples of web elements include paragraphs, tables, sections, buttons, text boxes, labels, drop down lists, etc. As will be hereinafter described in greater detail, the layout detection application 110 obtains the dimensions of each web element containing text as well as the text contained by the web elements. One aspect of the disclosure comprises techniques used by the layout detection application 110 for determining the dimensions of the text contained within a web element. The layout detection application 110 can then compare the dimensions of the text with the dimensions of the web elements containing the text to detect text truncation problems. The techniques herein described may be used to detect both horizontal text truncation and vertical text truncation. Also, while the techniques described herein are applied to detect text truncation in a GUI for a software product, those skilled in the art will appreciate that the techniques are applicable to detect text truncation in any HTML document that is rendered and displayed by a browser 120.

Figure 4:
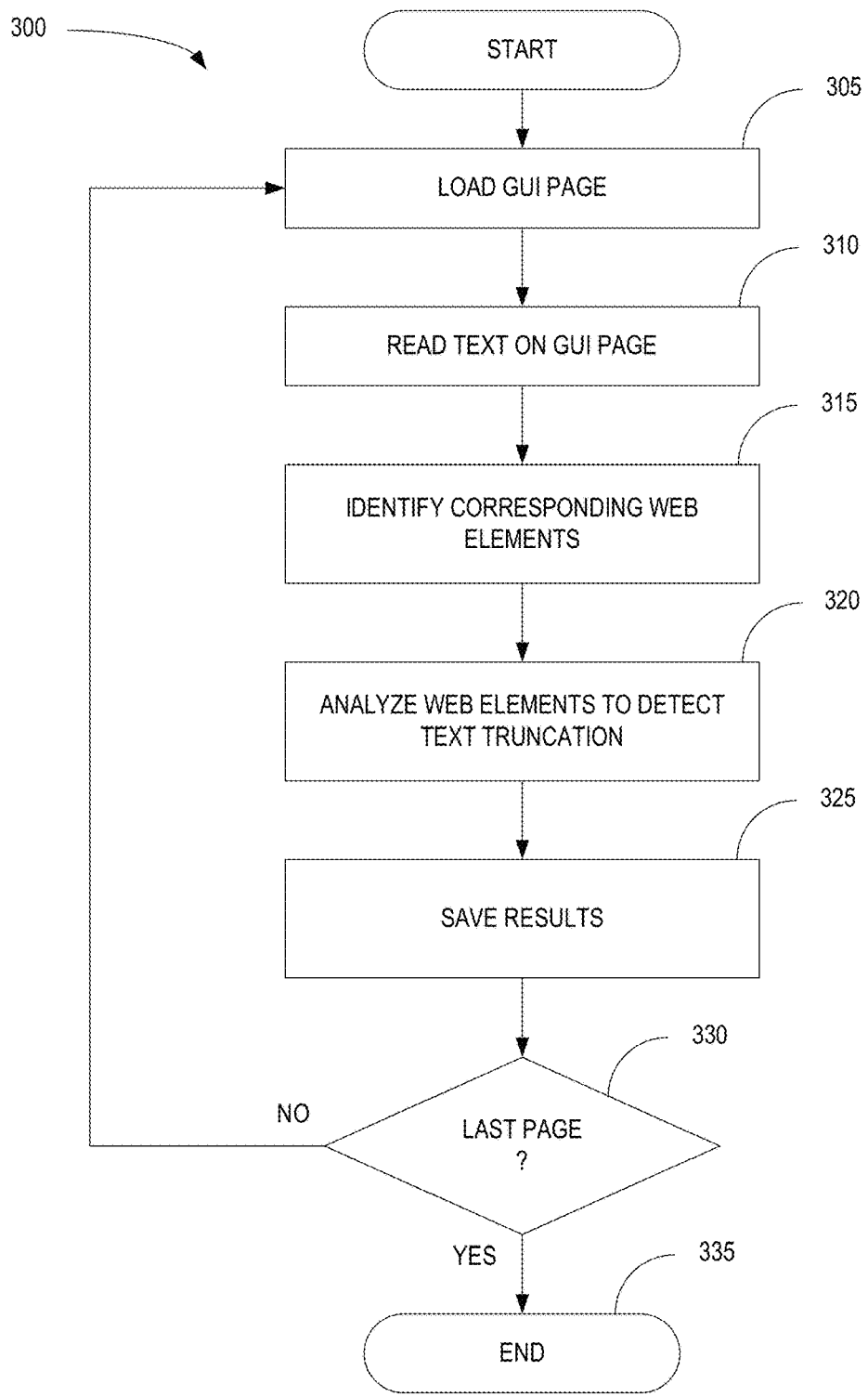
FIG. 4 illustrates a method of detecting text truncation in a GUI.

FIG. 4 illustrates an exemplary method 300 for detecting text truncation in a graphical user interface. To begin, the layout detection application 110 causes a selected browser 120 to load an initial page of the GUI (block 305). The layout detection system 110 then reads the text on the current page and identifies the corresponding web elements containing the text (blocks 310, 315). As previously noted, each page of the GUI is described by a HTML document and the web elements on the page containing text are represented as DOM objects. The layout detection application 110 may obtain a listing of DOM objects in the GUI page from the browser 120 and parse the listing of DOM objects to identify the web elements containing text. In one embodiment, the layout detection application 110 may generate a listing of the web elements containing text and the corresponding text. This list is referred to herein as the web element list.

Figures 5, 8:
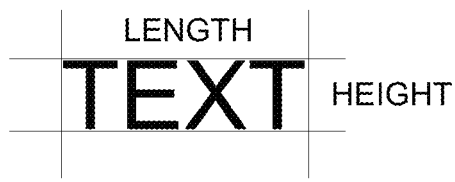
FIG. 5 illustrates an exemplary web element list used for detecting text truncation in a GUI.
FIG. 8 illustrates a trial web element used to determine dimensions of text in a GUI.

FIG. 5 illustrates an exemplary web element list used in detecting text truncation according to one embodiment. Each row in the list represents a web element. The first column contains a handle or other identifer for the web element. The second column contains the text that is displayed in the web element. The last column indicates results of the testing performed by the layout detection application 100. Those skilled in the art will appreciate that the web element list could include more columns for additional information. For example, the web element list could include columns for storing the dimensions of the web elements and the dimensions of the text. Also, it will be appreciated that some embodiments may be implemented without using a web element list as described herein. Thus, the example web element list should not be construed as being limiting or construed as requiring a web element list.

Referring back to FIG. 4, after generating the web element list, the layout detection application 110 analyzes each web element in the web element list to detect instances of text truncation (block 320). After examining each web element, the layout detection application 110 saves the results (block 325). For example, the layout detection application 110 may enter a code value indicating the results of the test for each web element in the results column of the web element list. The code value may be used to indicate whether a text truncation problem exists. For example, a code value of "0" may be used to indicate no text truncation, a code value of "1" may be used to indicate horizontal text truncation, a code value of "2" may be used to indicate vertical text truncation, and a code value of "3" may be used to indicate horizontal and vertical text truncation. After saving the results of the analysis, the layout detection application 110 determines whether there are any more pages s to be tested (block 330). If so, the layout detection system 100 loads the next page (block 335) and returns to block 310 to repeat the procedure. The processing continues until the last page is reached at which time the process ends (block 340).

Figure 6:
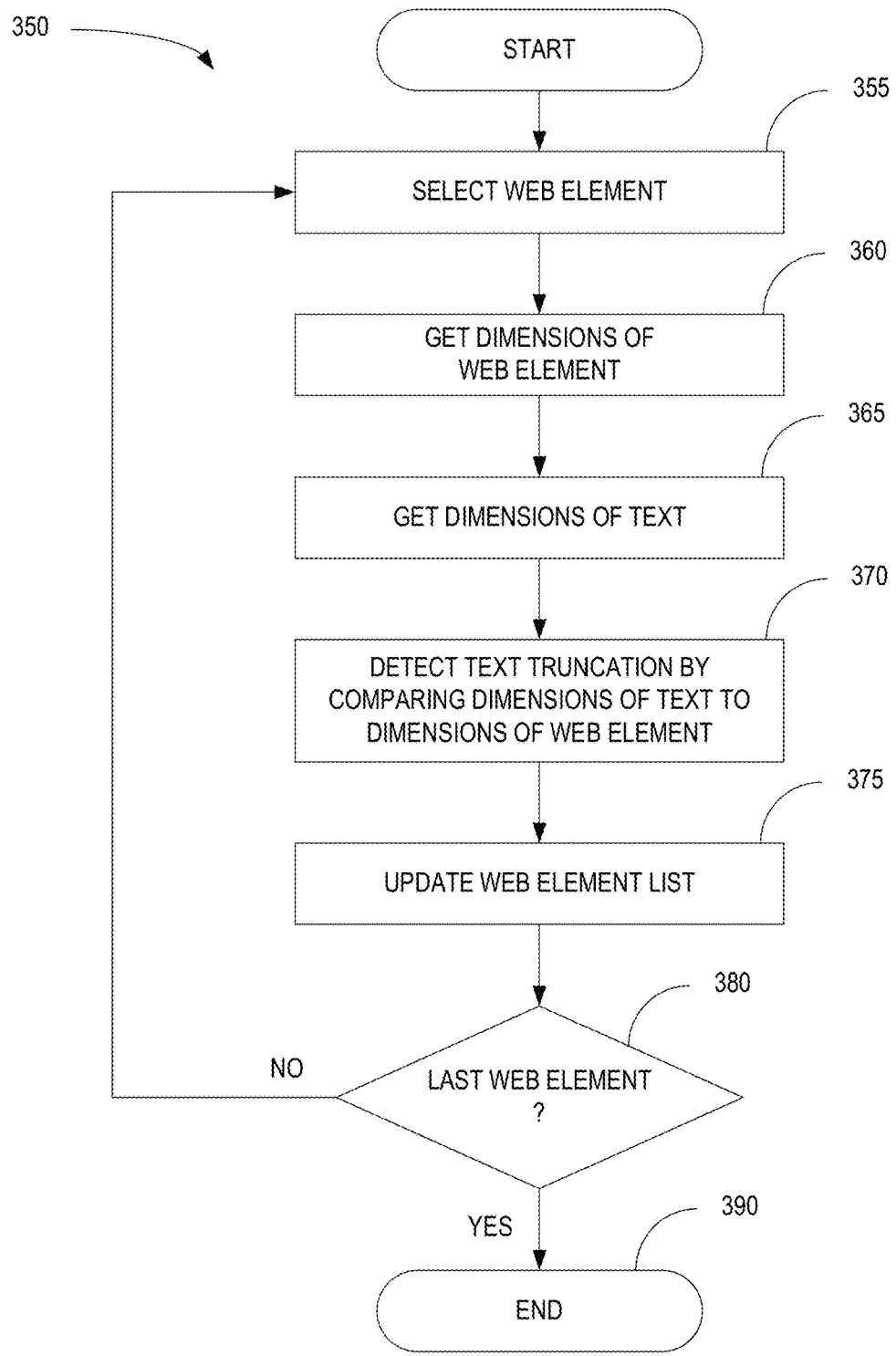
FIG. 6 illustrates a method of analyzing web elements in a GUI to detect text truncation, which may be used in the method of FIG. 3.
Figure 7:
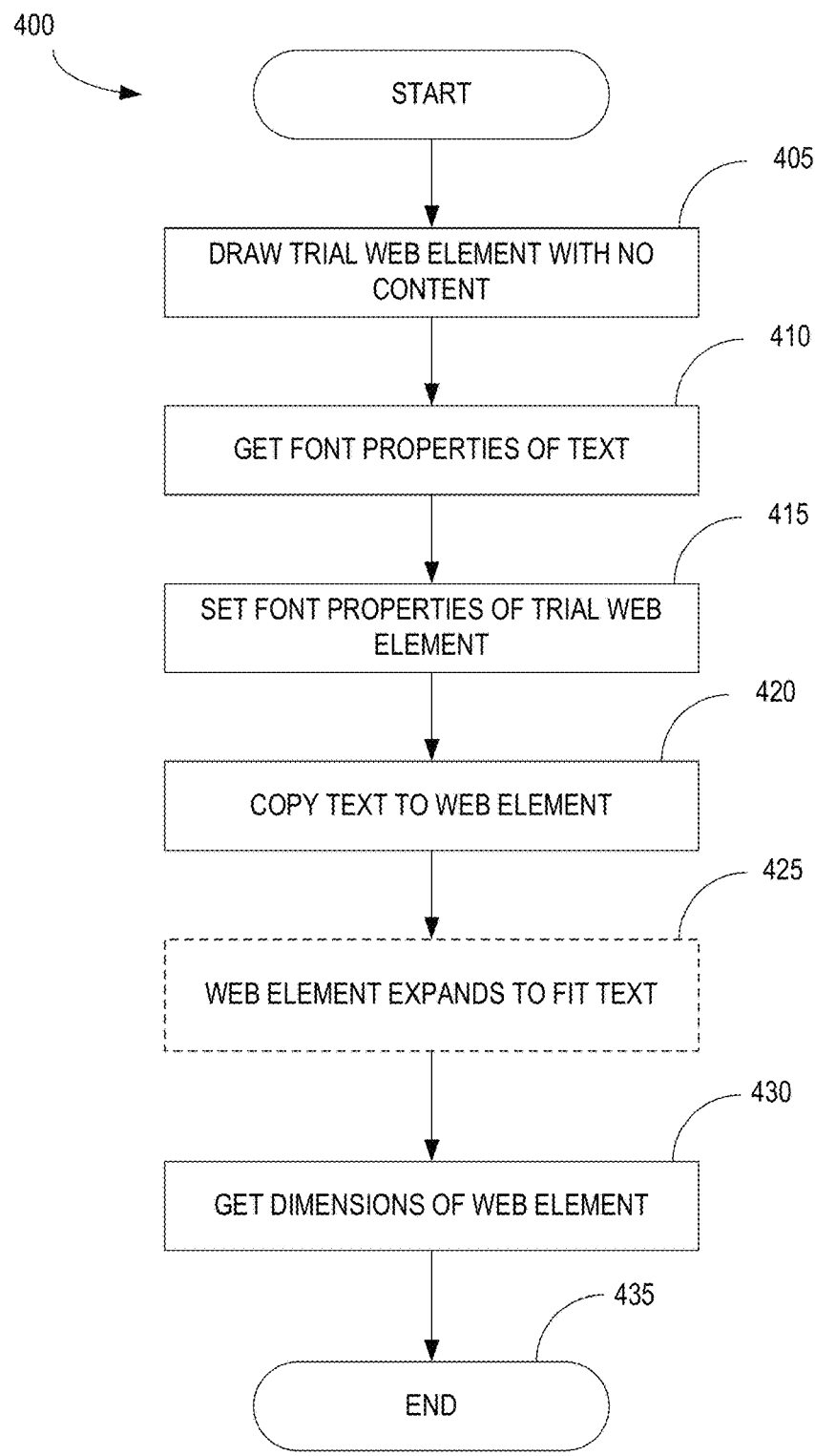
FIG. 7 illustrates a method of obtaining the dimensions of text displayed in a GUI, which may be used in the method of FIG. 4.

FIG. 6 illustrates an exemplary method 350 used by the layout detection application 110 for analyzing web elements to detect text truncation. The method shown in FIG. 6 may be performed at block 325 of FIG. 4. In general, the method 350 iterates through the list of web elements in the web element list beginning with a first web element to identify those web elements that truncate the text contained in the web element. To start the analysis of web elements, the layout detection application 110 selects a web element in the GUI that contains text(block 355). The order of the selection is not important. One simple method is to select the first element in the list and iterate through the list in order. The layout detection application 110 then gets the dimensions of the web element (block 360) and the dimensions of the text contained in the selected web element (block 365). In general, the API provided by the DOM enables the layout detection application 110 to query the browser 120 to obtain the web element dimensions. However, the DOM typically does not include any method for obtaining the dimensions of text displayed within the web element. One technique for obtaining the text dimensions is shown in FIG. 7 and described below. Once the text dimensions are obtained, the trial application 110 detects text truncation by comparing the text dimensions to the dimensions of the corresponding web element in which the text is displayed (block 370). The layout detection application 110 may update the web element list to reflect the results of the test (block 375). The layout detection application 110 then determines whether it has reached the last web element (block 380). If not, the layout detection application 110 repeats the procedure beginning at block 355. The layout detection application 110 iterates through each web element in the web element list to determine, for each web element, whether text truncation occurs. Once the last element is reached, the procedure ends (block 390).

FIG. 7 illustrates an exemplary method 400 used by the layout detection application 110 for obtaining the dimensions of text displayed in a GUI. The method may be performed at block 365 in FIG. 6 to obtain the text dimensions and may be implemented, for example, using the Java Abstract Window Tool Kit (AWT) or similar GUI tool kit as will be hereinafter described. The Java AWT provides a canvas on which graphical elements can be drawn. To get the text dimensions, the layout detection application 110 uses Java AWT to draw an invisible web element with no content on a canvas (block 405). The invisible web element, referred to herein as a trial web element, has no border, no padding, no dimensions, and no style definitions. Next, the layout detection application 110 gets the font properties for the text displayed in the GUI (block 410). The font properties include the font family, font size and font weight of the text. The font properties may be obtained, for example, using the DOM from the HTML document representing the page of the GUI. The layout detection application 110 then sets the properties of the trial web element to be the same as the font properties of the text to be displayed in the actual web element in the GUI (block 415). After setting the font properties, the layout detection application 110 copies the text to the trial web element (block 420). When the text is copied to the trial web element, the trial web element will expand to accommodate the text (block 425). After drawing the trial web element, setting the font properties, and copying the text, an image is created on the canvas that is invisible. If made visible, the image generated would appear as shown in FIG. 8. The boundary of the image is shown by the solid lines. Using the Java AWT, the layout detection application 110 can obtain the image dimensions which is equal to the text dimensions (block 430). These dimensions are taken as the dimensions of the text and used at block 370 of FIG. 6 to detect text truncation.

Figure 9:
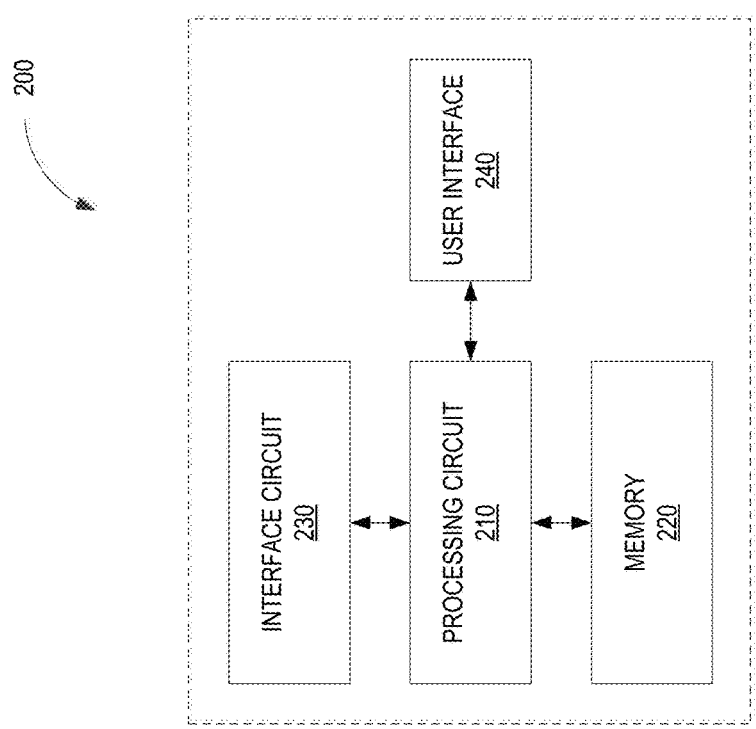
FIG. 9 illustrates the main functional components of layout detection system for detecting text truncation in a GUI.

FIG. 9 is a block diagram illustrating some of the functional components of a computing device 200 configured to function as a layout detection system 100. The computing device 200 in one embodiment comprises comprises a processor circuit 210, a memory circuit 220 that stores program code and data needed for operation, and an interface circuit 230 for communicating with remote devices, such as application server 150, over a communication network. In some embodiments, the computer may further include a user interface 240. In some embodiments, the computing device 200 may further include a user interface 240. Those skilled in the art will readily appreciate that the computing device 200 seen in FIG. 9 may comprise more or fewer components that are illustrated here.

The processor circuit 210 may be implemented as one or more microprocessors, hardware, firmware, or a combination thereof. The processor circuit 210 is configured to perform GUI testing as herein described. Memory 220 stores programs and instructions, such as layout detection application 110 and browsers 120, that are used by the processor circuit 210 to perform GUI testing. Memory 220 may comprise any non-transitory, solid state memory or computer readable storage media known in the art. Suitable examples of such media include, but are not limited to, ROM, DRAM, Flash, or a device capable of reading computer-readable storage media, such as optical or magnetic media. The interface circuit 230 comprises a transceiver or other communications interface that facilitates communications with remote devices via a communication network, such as an IP network 12. Those of ordinary skill in the art will appreciate that the interface circuit 230 may be configured to communicate with these entities using any protocol known in the art. However, in one embodiment, the interface circuit 230 comprises an ETHERNET card configured to transmit and receive data using the well-known TCP/IP protocol. The user interface 240 may comprise a display and one or more input devices. The display may comprise an LED or LCD display. In one embodiment, a touch screen display may be used that also functions as an input device. The input device(s) may comprise a keyboard, keypad, joystick, track ball, touch pad, or voice input, image input, or other input device.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   identifying text displayed in a graphical user interface and a corresponding web element containing the text;
   obtaining dimensions of the text by:
      generating a trial web element that has no content, the trial web element having a property that its dimensions expand to fit copied text;
      copying the text to the trial web element, thus causing the dimensions of the trial web element to expand to fit the copied text; and
      after copying the text, obtaining the expanded dimensions of the trial web element;
   obtaining dimensions of the corresponding web element; and detecting text truncation by comparing dimensions of the text to the dimensions of the corresponding web element.

2. The computer-implemented method of claim 1 wherein generating the trial web element that has no content comprises generating an invisible trial web element with no dimensions.

3. The computer-implemented method of claim 2 wherein generating the trial web element that has no content comprises generating the trial web element with no border, no padding, and no style definitions.

4. The computer-implemented method of claim 1 further comprising assigning desired font properties for the text to the trial web element.

5. The computer-implemented method of claim 4 wherein assigning desired font properties for the text to the trial web element is performed before copying the text to the trial web element.

6. The computer-implemented method of claim 4 wherein obtaining the dimensions of the trial web element is performed after assigning desired font properties for the text to the trial web element.

7. The computer-implemented method of claim 1 wherein the graphical user interface comprises a graphical user interface for a software product.

8. A computing device comprising:
an interface circuit for communicating via a communication network with remote devices; and
a processor circuit configured to:
identify text displayed in a graphical user interface and a corresponding web element containing the text;
obtain dimensions of the text by:
generating a trial web element that has no content, the trial web element having a property that its dimensions expand to fit copied text;
copying the text to the trial web element; and
after copying the text, obtaining the expanded dimensions of the trial web element;
obtain dimensions of the corresponding web element; and
detect text truncation by comparing dimensions of the text to the dimensions of the corresponding web element.

9. The computing device of claim 8 wherein the trial web element generated by the processor circuit comprises an invisible trial web element with no dimensions.

10. The computing device of claim 8 wherein the trial web element generated by the processor circuit comprises a trial web element with no border, no padding, and no style definitions.

11. The computing device of claim 8 wherein the processor circuit is further configured to assign desired font properties for the text to the trial web element.

12. The computing device of claim 11 wherein the processor circuit is further configured to assign desired font properties for the text to the trial web element before copying the text to the trial web element.

13. The computing device of claim 11 wherein the processor circuit is further configured to assign desired font properties for the text to the trial web element before obtaining the dimensions of the trial web element.

14. The computing device of claim 8 wherein the graphical user interface comprises a graphical user interface for a software product.

15. A computer readable storage medium storing executable program code that when executed by a processor circuit in a computing device, causes the computing device to:
identify text displayed in a graphical user interface and a corresponding web element containing the text;
obtain dimensions of the text by:
generating a trial web element that has no content, the trial web element having a property that its dimensions expand to fit copied text;
copying the text to the trial web element, wherein the copying causes the dimensions of the trial web element to expand to fit the copied text; and
after copying the text, obtaining the expanded dimensions of the trial web element;
obtain dimensions of the corresponding web element; and
detect text truncation by comparing dimensions of the text to the dimensions of the corresponding web element.

16. The computer readable storage medium of claim 15, wherein to generate the trial web element that has no content, and to obtain the expanded dimensions of the trial web element, the program code causes the computing device to use a software toolkit.

17. The computer readable storage medium of claim 15, wherein to identify the text displayed in the graphical user interface, the program code causes the computing device to interact with and control a web browser application.

18. The computer readable storage medium of claim 17, wherein to identify the text displayed in the graphical user interface, the program code causes the computing device to navigate among different pages of the graphical user interface using the web browser application.

19. The computer readable storage medium of claim 18, wherein to identify the text displayed in the graphical user interface, the program code causes the computing device to read text on a current page of the graphical user interface and identify corresponding web elements containing the text that has been read.

20. The computer readable storage medium of claim 17, wherein to obtain dimensions of the corresponding web element, the program code causes the computing device to query the web browser application.

* * * * *